United States Patent [19]
Fishwick et al.

[11] 3,993,438
[45] Nov. 23, 1976

[54] PROCESS FOR COLORING AROMATIC POLYESTER-CELLULOSE UNIONS WITH A REACTIVE DYESTUFF AND A DISPERSE DYESTUFF CONTAINING AT LEAST TWO CARBOXYLIC ACID ESTER GROUPS

[75] Inventors: Brian Ribbons Fishwick; Violet Boyd; Brian Glover, all of Manchester, England

[73] Assignee: Imperial Chemical Industries Limited, London, England

[22] Filed: Apr. 3, 1975

[21] Appl. No.: 564,899

[30] Foreign Application Priority Data
Apr. 3, 1974 United Kingdom............... 14783/74

[52] U.S. Cl. .................................. 8/21 C; 8/25; 8/41 C; 8/54.2; 8/163; 8/165; 8/74
[51] Int. Cl.² ........................................... D06P 3/82
[58] Field of Search ............................ 8/21 C, 41 C

[56] References Cited
UNITED STATES PATENTS
3,163,635  12/1964  Riat et al. ........................... 260/153
3,767,356  10/1973  Turner ................................. 8/21 C FOREIGN PATENTS OR APPLICATIONS
1,380,845  1/1975  United Kingdom
1,087,673  10/1967  United Kingdom OTHER PUBLICATIONS
Schmidlin, "Preparation and Dyeing of Synthetic Fibres" (Chapman & Hall, London), 1963, p. 403.
Ulrich and Stern, American Dyestuff Reporter, 1964 (Aug. 17) pp. 13–15.
Cheetham, "Dyeing Fibre Blends" (Van Nostrand, London), 1966, pp. 260–264.

*Primary Examiner*—Joseph L. Schofer
*Assistant Examiner*—A. L. Clingman
*Attorney, Agent, or Firm*—Cushman, Darby & Cushman

[57] ABSTRACT

An improved process for the continuous coloration of aromatic polyester/cellulose unions which comprises continuously applying to the said unions a reactive dyestuff and a disperse dyestuff containing at least two carboxylic acid ester groups, fixing the dyestuffs on the union, and thereafter subjecting the colored union to a treatment in an aqueous alkaline bath at a pH above 8.0 and at a temperature between 50° and 85° C, whereby the unions are padded or printed in a wide variety of shades possessing excellent fastness properties and there is little or no staining of any unprinted areas of the unions.

8 Claims, No Drawings

PROCESS FOR COLORING AROMATIC POLYESTER-CELLULOSE UNIONS WITH A REACTIVE DYESTUFF AND A DISPERSE DYESTUFF CONTAINING AT LEAST TWO CARBOXYLIC ACID ESTER GROUPS

This invention relates to a continuous process for the coloration of aromatic polyester/cellulose unions using mixtures of disperse and reactive dyestuffs.

Although it is well known that aromatic polyester/cellulose unions can be colored with mixtures of disperse and reactive dyestuffs, the known processes suffer from the disadvantage that the disperse dyestuffs, in addition to coloring the aromatic polyester part of the union, also stain the cellulose part of the union. In order that the colored union has the maximum fastness properties it is essential that this staining be removed, but in practice it is found difficult to remove the staining, for example by a "reduction-clear" or "oxidation-clear" treatment, without simultaneously destroying the reactive dyestuff which is attached to the cellulose part of the union. Further in the absence of such a treatment, any dyestuff which is removed by, for example, an ordinary washing treatment, can give rise, particularly in the case of prints, to back staining resulting in staining of other areas of the print, or dull tones. It has now been found that these difficulties can be overcome by using, as the disperse dyestuff, disperse dyestuffs which contain at least two carboxylic acid ester groups as any staining of the cellulose caused by such dyestuffs can readily be removed by a simple alkaline treatment which has no adverse effect on the reactive dyestuff used to dye the cellulose. In addition this treatment removes any unfixed disperse dyestuff from the polyester fibres, and there is little or no tendency for any of the disperse dyestuff so removed to back stain the union.

According to the present invention there is provided an improved process for the continuous coloration of aromatic polyester/cellulose unions which comprises continuously apply to the said unions a reactive dyestuff and a disperse dyestuff containing at least two carboxylic acid ester groups, fixing the dyestuffs on the union, and thereafter subjecting the colored union to a treatment in an aqueous alkaline bath at a pH above 8.0 and at a temperature between 50° and 85° C.

The said disperse dyestuff and the reactive dyestuff can be applied in separate steps in either order but are preferably applied together.

Thus the process of the invention can be conveniently carried out by continuously padding or printing the union with a padding liquor or print paste containing the said disperse dyestuff, the reactive dyestuff and an alkaline agent. The padded or printed union is then preferably dried and is then subjected to a heat treatment to fix the dyestuffs on the union. This heat treatment can for example comprise treatment with superheated steam or in steam either at atmospheric pressure or under pressure, or a baking treatment in hot air at temperatures in the region of 150° to 230° C, or by passing the union over a heated surface for example over a calender at 150° to 230° C. At the conclusion of the heat treatment the union is optionally rinsed in water and is then given a treatment in a hot aqueous alkaline solution having a pH of at least 8.0 and preferably having a pH in the range of 10.0 to 13.5, more particularly 10 to 11.5. The temperature of the said alkaline solution is preferably in the range of 60° to 80° C, higher temperatures generally being used at the lower pH's and vice-versa, and the time of treatment will vary on the depth of shade which has been applied to the union and the type of equipment which is being used, however the times are usually in the range of 30 seconds to 30 minutes. If desired the said alkaline solution can also contain a small amount (for example 0.2 to 1.0%) of a synthetic detergent. After the alkaline treatment the union is rinsed in water, optionally containing a synthetic detergent, and is then dried.

The said alkaline solutions are prepared from alkaline agents such as ammonia or ammonium salts or organic amines such as triethanolamine, but preferred alkaline agents are carbonates or hydroxides of alkali metals such as lithium, potassium and sodium.

In addition to the dyestuffs, the padding liquors or print pastes can contain any of the adjuvants which are conventionally employed in such liquors or pastes, for example thickening agents, migration inhibitors, cationic, anionic or non-ionic dispersing agents, urea, humectants, solubilizing agents, bacteriocides, sequestering agents, wetting agents, emulsifiers, oxidizing agents such as sodium chlorate or sodium m-nitrobenzene sulphonate, fixation accelerators such as diphenyl and derivatives thereof or polyethylene oxide adducts known as carriers or fixation accelerators, or antifoam agents such as organic derivatives of silicon. The said padding liquors or print pastes can be slightly acidic or neutral but are preferably slightly alkaline which can be achieved by incorporating therein a small amount, up to 2% by weight, of an alkaline agent such as sodium bicarbonate or sodium carbonate. Alternatively the print pastes or padding liquors can contain a substance, such as sodium trichloroacetate, which on heating or steaming liberates an alkaline agent.

When the said padding liquors or print pastes are slightly acidic or neutral then it is usually necessary to subsequently treat the padded or printed union with an alkali in order to obtain satisfactory fixation of the reactive dyestuff. This treatment with an alkali can be carried out before, but is preferably carried out after the fixation of the disperse dyestuff. However in the case of certain classes of reactive dyestuffs, for example those containing a 4-chloro-6-hydroxy-1:3:5-triazin-2-ylamino group, fixation of such dyestuffs following application from neutral or acidic medium can be effected by a heat treatment without the use of alkali.

When the dyestuffs are separately applied then the process of the invention can for example be conveniently carried out by padding or printing the said union with a padding liquor or print paste containing the disperse dyestuff, drying, heating or steaming the union to effect fixation of the disperse dyestuff, padding or printing the union with a padding liquor or print paste containing a reactive dyestuff and an alkali, fixing the reactive dyestuff by heating or steaming or, in the case of highly reactive dyestuffs, batching the union in a moist state. The union is then, optionally after rinsing in water, given a treatment in a hot aqueous solution of an alkaline agent at a pH above 8.0. If desired in this method of carrying out the process of the invention the dyestuffs can be applied in the reverse order.

When the reactive dyestuff is fixed by an alkaline shock treatment involving the use of a high concentration of an alkali as the last stage in applying both dyestuffs to the union, then when the union is subsequently given a rinse in water to remove the excess alkali the resulting alkaline solution can itself act as the aqueous alkaline bath, as hereinbefore defined, so that a separate treatment in such a bath may not be necessary.

The aromatic polyester/cellulose unions used in the process of the invention can be any textile materials which are mixtures of aromatic polyester fibres and cellulose fibres. Such unions are usually in the form of knitted, or preferably woven goods. The percentage of aromatic polyester fibres is usually in the range of 20 to 95%, and preferably 30 to 85%, by weight of the weight of the union. The aromatic polyester fibres are preferably polyethylene terephthalate fibres, and the cellulose fibres are preferably cotton, linen, viscose rayon or polynosic rayon fibres.

Although the invention is described with reference to the padding liquor or print paste containing a disperse dyestuff and a reactive dyestuff, in many cases, in order to obtain the required shades, it is necessary to use a mixture of the said disperse dyestuffs and/or a mixture of the reactive dyestuffs, and the use of such mixtures is within the scope of the invention. Preferably the disperse dyestuff, or mixture thereof, and the reactive dyestuff, or mixture thereof, are so chosen that the polyester fibres and the cellulose fibres present in the union are colored to substantially the same shade.

The disperse dyestuffs containing at least two carboxylic acid ester groups can be a dyestuff of any of the known classes of disperse dyestuffs containing at least two of the specified groups in particular of the nitro, methine, azomethine, anthraquinone and, above all, azo in particular monoazo series. The carboxylic acid ester groups are preferably of the formula:—COOR wherein R is an optionally substituted hydrocarbon of heterocylic radical. In particular R is cyclo alkyl such as cyclohexyl, monocyclic aryl such as phenyl, tolyl and xylyl and substituted derivatives thereof such as anisyl, chlorophenyl and bromophenyl, monocyclic aryl alkyl such as benzyl or β-phenylethyl, or preferably an alkyl radical such as hexyl, octyl, dodecyl but more especially lower alkyl containing from 1 to 4 carbon atoms such as ethyl, propyl, butyl and above all methyl. Alternatively R can be a substituted alkyl radical in particular substituted lower alkyl for example hydroxy lower alkyl such as β-hydroxyethyl and lower alkoxy lower alkyl such as γ-methoxypropyl. The said carboxylic acid ester groups can be directly attached to carbon atoms of a benzene or heterocyclic ring or rings present in the dyestuff molecule or attached thereto by a bridging group such as O-alkylene or -N-alkylene-. A preferred class of such azo dyestuffs comprises the dyestuffs of the formula:

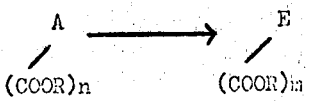

wherein A is the residue of a diazo component of the aromatic or heterocyclic series and E the residue of a coupling component, R has the above stated meaning, and n and m each independently represent 0, 1 or 2, the sum of n and m being at least 2.

A second preferred class of azo dyestuffs comprises the dyestuffs of the formula:

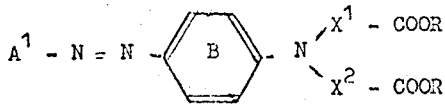

wherein $A^1$ is the radical of a diazo component of the aromatic or heterocyclic series, the benzene ring B can contain additional substituents, R has the meaning stated, and $X^1$ and $X^2$ each independently represent lower alkylene or lower alkylene-O-lower alkylene radicals wherein lower alkylene denotes alkylene radicals of from 1 to 6 carbon atoms.

A further preferred class of azo dyestuffs comprises the dyestuffs of the formula:

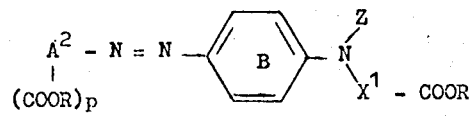

wherein B, $X^1$ and R have the meanings stated, Z is a hydrogen atom or an optionally substituted alkyl, cycloalkyl or aryl radical, $A^2$ is the radical of a diazo component of the aromatic or heterocyclic series, and p is 1 or 2.

A still further preferred class of azo dyestuffs comprises the dyestuffs of the formula:

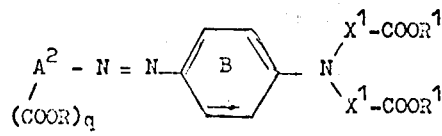

wherein $A^2$, B, R and $X^1$ have the meanings stated, $R^1$ is lower alkyl, and q is 2 or, preferably, 1.

As examples of substituents which can be present on the benzene ring B there may be mentioned lower alkyl in particular methyl, lower alkoxy such as methoxy and ethoxy, chlorine, bromine and acylamino groups in particular acylamino groups of the formulae

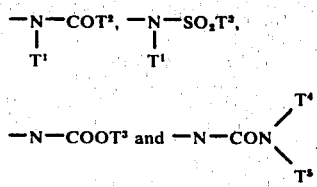

wherein $T^1$, $T^4$ and $T^5$ are each independently hydrogen or lower alkyl, $T^2$ is hydrogen, lower alkyl or monocyclic aryl, and $T^3$ is lower alkyl or monocyclic aryl. Preferably the said acylamino group is of the formula: —NHCO lower alkyl.

Throughout this Specification the terms "lower alkyl" and "lower alkoxy" are used to denote alkyl and alkoxy radicals respectively containing from 1 to 4 carbon atoms.

The radicals of the diazo components represented by A, $A^1$ and $A^2$ can be the radicals of any diazo components of the heterocyclic series, in particular optionally substituted thiazol-2-yl, benzthiazol-2-yl, thien-2-yl, benz-2:1-isothiazol-3-yl, benz-1:2-isothiazol-3-yl, 1:2:4-thiadiazol-5-yl, 1:3:4-thiadiazol-2-yl, isothiazol-5-yl, pyrazol-3-yl, imidiazol-(2-or -5)yl, 1:2:4-triazol-3-yl and tetrazol-5-yl radicals. In particular A, $A^1$ and $A^2$ are the radical of a diazo component of the aromatic series in particular an optionally substituted naphthyl and, above all, an optionally substituted phenyl radical. The substituent or substituents present on such radicals can be any of the substituents, apart from carboxylic acid and sulphonic acid groups, which are conventionally present on the diazo radicals of disperse azo dyestuffs, for example chlorine, bromine, nitro, cyano, trifluoromethyl, lower alkyl, lower alkoxy, lower alkylsulphonyl, lower alkyl carbonyl, acylamino in particular lower alkylcarbonylamino, sulphonamido and N-substituted and N:N-disubstituted derivatives thereof, carbonamido and N-substituted and N:N-disubstituted derivatives thereof, and carboxylic acid ester groups in particular lower alkoxy carbonyl. Preferably A, $A^1$ and $A^2$ are optionally substituted phenyl radicals and in particular radicals of the formulae

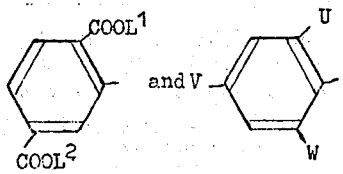

wherein $L^1$ and $L^2$ are each independently lower alkyl; U and W are each independently hydrogen, lower alkyl, chlorine, bromine, lower alkoxy, nitro, cyano or lower alkoxy carbonyl, and V is hydrogen, nitro, chlorine, bromine, lower alkyl, lower alkoxy, cyano, lower alkoxy carbonyl, sulphonamido or carbonamido and N- and N-N-substituted derivatives thereof, lower alkylcarbonyl and lower alkyl sulphonyl. Preferably V is nitro.

In the above classes A, $A^1$ and $A^2$ preferably represent a phenyl radical which can contain up to 3 substituents, preferably the substituents exemplified above as being present on the said diazo radical.

The said disperse dyestuffs used in the process of the invention can be obtained by the methods which are conventionally employed in preparing disperse dyestuffs, provided that the methods employ the use of the appropriate reactants containing in total at least two —COOR groups. Thus, for example, disperse azo dyestuffs for use in the process can be obtained from diazo and coupling components which together contain at least two —COOR groups.

The reactive dyestuffs used in the process of the invention can be any water-soluble dyestuffs which contain at least one fibre-reactive group, this being defined as a group whose presence in the dyestuff molecule renders the dyestuff capable of chemically combining with hydroxy groups present in cellulose textile materials so that the dyestuff molecule becomes attached to the cellulose molecule through a covalent chemical bond or bonds. Each fibre-reactive group is attached to a carbon atom present in the dyestuff molecule and preferably to a carbon atom of an aromatic ring, preferably a benzene ring, present in the dyestuff molecule. The said dyestuffs are preferably dyestuffs of the azo, including monoazo and polyazo and metallized azo hyes, anthraquinone, formazan, triphendioxazine, nitro and phthalocyanine series containing at least one fibre-reactive group.

As examples of fibre-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino, β:γ:γ-trichlorocrotonylamino and tetrafluorocyclobutylacryloylamino. Alternatively the fibre-reactive group can be a vinyl sulphone, β-chloroethyl sulphone, β-sulphatoethylsulphonyl, β-chloroethylsulphonamide or an optionally N substituted β-aminoethylsulphonyl group.

The fibre-reactive group is preferably a heterocyclic radical having two or three nitrogen atoms in the heterocyclic ring and at least one labile substituent attached to a carbon atom of the heterocyclic ring. As examples of labile substitutents there may be mentioned chlorine, bromine, fluorine, quaternary ammonium groups, thiocyano, sulphonic acid, hydrocarbylsulphonyl groups, groups of the formula

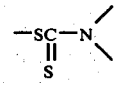

wherein the nitrogen atom carries optionally substituted hydrocarbon or heterocyclic radicals and groups of the formula:

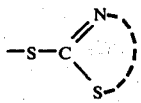

wherein the dotted line indicates the atoms necessary to form an optionally substituted or fused heterocyclic ring.

As specific examples of such fibre-reactive heterocyclic radicals there may be mentioned 3:6-dichloropyridazine-4-carbonylamino, 2:3-dichloroquinoxaline -5- or 6- (sulphonyl or carbonyl) amino, 2:4-dichloroquinazoline-6- or 7-sulphonylamino, 2:4:6-trichloroquinazoline-7-or 8-sulphonylamino, 2:4:7 or 2:4:8-trichloroquinazoline-6-sulphonylamino, 2:4-dichloroquinazoline-6-carbonylamino, 1:4-dichlorophthalazine-6-carbonylamino, 4:5-dichloropyridazon-1-ylamino, 2:4-dichloropyrimid-5-ylcarbonylamino, 1-(phenyl-4'-carbonylamino)-4:5-dichloropyridazone, 1-(phenyl-4'-sulphonylamino)-4:5-dichloropyridazone, 2:4- and/or 2:6- dichloro- or bromo- pyrid-6- (and/or -4)ylamino, difluorochloropyrimidylamino, trichloropyrimidylamino, tribromopyrimidylamino, dichloro-5-(cyano, nitro, methyl or carbomethoxy)-pyrimidylamino, 2-methylsulphonyl-6-chloropyrimid-4-ylcarbonylamino and 5-chloro-6-methyl-2-methylsulphonylpyrimid-4-ylamino, and more particularly 1:3:5-triazin-2-ylamino radicals which contain a fluorine or a bromine and, above all, a chlorine atom on at least one of the 4- and 6- positions, for example 4:6-dichloro-1:3:5-triazin-2-ylamino. When the triazine nucleus contains only a single halogen atom, preferably a chlorine atom, then the third carbon atom of the triazine ring can be substituted by a hydrocarbon radical, such as methyl or phenyl, but more particularly by an optionally substituted -hydroxy, mercapto or amino group, such as methoxy, phenoxy, α-and β-naphthoxy, methylmercapto, phenylthio, methylamino, diethylamino, cyclohexylamino and anilino and N-alkylanilino and substituted derivatives thereof such as anisidino, toluidino, carboxylanilino, sulphoanilino, disulphoanilino and sulphonated naphthylamino.

Thus, a preferred class of the reactive dyestuffs comprises those dyestuffs which contain as the fibre-reactive group a group of the formula:

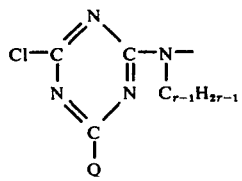

wherein r is 1 or 2, and Q is a chlorine atom, an optionally substituted amino group or an etherified hydroxyl group.

The optionally substituted amino groups represented by Q are preferably optionally substituted alkylamino, anilino, or N-alkylanilino groups, e.g. methylamino, ethylamino, β-hydroxyethylamino, di-(β-hydroxyethyl)amino, β-methoxyethylamino, β-sulphatoethylamino, anilino, o-, m- and p- sulphoanilino, 4- and 5- sulpho-2-carboxyanilino, 4- and 5-sulpho-2-methoxyanilino, 4- and 5-sulpho-2-methylanilino, 4- and 5-sulpho-2-chloroanilino, 4- and 5- sulpho-2-chloroanilino, 2,4- 2,5-and 3,5- disulphoanilino, N-methyl-m- and p- sulphoanilino.

If desired the fibre-reactive group can be of the type:

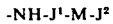

wherein J¹ is a pyrimidine or triazine ring optionally carrying a labile substituent, J² is a pyrimidine or triazine ring carrying at least one labile substituent and M is a bridging member which is linked to J¹ and J² through optionally substituted imino groups, said imino groups being linked together through an alkylene or arylene radical such as ethylene, 1:4-phenylene or 2-sulpho-1:4-phenylene.

Other linking groups of particular interest represented by M are the divalent radicals of stilbene, diphenyl, diphenyloxide, diphenylamine, diphenylurea, diphenoxyethane and diphenylamino-s-triazine, which contain a sulphonic acid group in each benzene nucleus.

It is preferred that J¹ and J² should each represent a chloro-s-triazine group. Thus, a further class of reactive dyestuffs comprises those dyestuffs which contain as the fibre-reactive group a group of the formula:

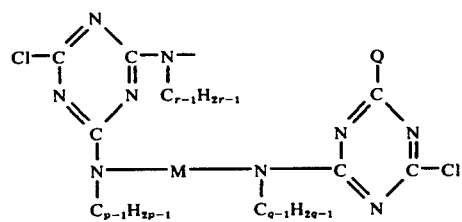

(7)

wherein r, p and q are each independently 1 or 2, and M and Q have the meanings stated above.

The group Q, as previously defined, includes within its scope groups which contain a chromophoric system linked to the carbon atom of the triazine ring through —NH— or —O—.

Such reactive dyestuffs can be obtained in conventional manner, for example by reacting a water-soluble dyestuff containing a primary or secondary amino group with a compound which contains the said fibre-reactive group. As examples of such compounds there may be mentioned acryloyl chloride, cyanuric chloride, 2:4:6-trichloropyrimidine,2:4:6-trichloro-5-(cyano- or chloro-) pyrimidine and 6-methoxy-2:4-dichloro-1:3:5-triazine.

By the process of the invention aromatic polyester/cellulose unions are colored in a variety of shades which have excellent fastness to the tests commonly applied to such textile materials, and there is excellent reserve of the white unprinted portions of such textile materials.

The invention is illustrated but not limited by the following Examples in which the parts and percentages are by weight.

EXAMPLE 1

A dispersion of 2 parts of 2-methyl-4-[N:N-di(β-methoxycarbonylethyl)amino]-2'-cyano-4'-nitroazobenzene in 7 parts of water containing 1 part of the disodium salt of bis(2-sulphonaphth-1-yl)methane is added to a mixture comprising:

| | |
|---|---|
| 10% aqueous solution of sodium alginate | 48.4 parts |
| Aqueous emulsion of sulphonated sperm oil and pine oil | 2 parts |
| Urea | 10 parts |
| Sodium bicarbonate | 1 part |
| Sodium m-nitrobenzenesulphonate | 1 part |
| Sodium hexametaphosphate | 0.6 parts |
| Pentasodium salt of 1-[4'-chloro-6'-(2''-carboxy-4''-sulphoanilino)-1':3':5'-triazin-2'-ylamino]-7-(1'-sulphonaphth-2'-ylazo)-8-naphthol-3:6-disulphonic acid | 1.2 parts |
| Tetrasodium salt of the copper complex of 1-(4'-chloro-6'-m-sulphoanilino-1':3':5'-triazin-2-ylamino)-7-(2'-hydroxy-3'-chloro-5'-sulphophenylazo)-8-naphthol-3:6-disulphonic acid | 0.5 part |
| Water to | 100 parts | and the resulting print paste is printed onto a woven 67:33 "Terylene"/cotton textile material ("Terylene" is a Registered Trade Mark), and the textile material dried. The textile material is then steamed for 6 minutes at 170° C at atmospheric pressure. The textile material is then rinsed in water, treated for 10 minutes at 85° C in an aqueous solution containing 0.2% of sodium carbonate and 0.2% of non-ionic detergent at a liquor ratio of 50:1, rinsed again in water and finally dried.

The textile material is thereby printed in a rubine shade having excellent reserve on the white unprinted portions, and the print has excellent fastness to wet treatments.

In place of the 0.2% of sodium carbonate used in the washing liquor there is used 0.2% of sodium hydroxide when a similar result is obtained.

In place of the 1 part of sodium bicarbonate used in the above Example there are used 3 parts of sodium trichloroacetete when a similar result is obtained.

Instead of steaming the printed textile material for 6 minutes 170° C, the printed textile material is baked for 1 minute at 200° C or subjected for 20 minutes to steam at a pressure of 1.4 Kg/cm² when similar results are obtained.

EXAMPLE 2

A dispersion of 2 parts of 2-methyl-4-[N:N-di(β-methoxycarbonylethyl)amino]-2'-cyano-4'-nitroazobenzene in parts of water containing 1 part of the disodium salt of bis(2-sulphonaphth-1-yl)methane is added to a mixture comprising:

| | |
|---|---|
| 10% aqueous solution of sodium alginate | 48.4 parts |
| Aqueous emulsion of sulphonated sperm oil | 2 parts |

-continued

| | |
|---|---|
| and pine oil | |
| Urea | 10 parts |
| Sodium-m-nitrobenzenesulphonate | 1 part |
| Sodium hexametaphosphate | 0.6 parts |
| Pentasodium salt of 1-[4'-chloro-6'-(2''-carboxy-4''-sulphoanilino)1':3':5':-triazin-2'-ylamino]-7-(1'-sulphonaphth-2'-ylazo)-8-naphthol-3:6-disulphonic acid | 1.2 parts |
| Tetrasodium salt of the copper complex of 1-(4'-chloro-6'-m-sulphoanilino-1':3':5'-triazin-2-ylamino)-7-(2'-hydroxy-3'-chloro-5'-sulphophenylazo)-8-naphthol-3:6-disulphonic acid | 0.5 part |
| Water to | 100 parts | and the resulting print paste is printed into a woven 67:33 "Terylene"/cotton textile material, and the textile material dried. The textile material is then baked for 1 minute at 200° C. The printed textile material is then immersed for 10 seconds in an aqueous solution at 98° C containing 1.9% of sodium hydroxide, 15% of sodium carbonate, 5% of potassium carbonate and 10% of sodium chloride. The print is then rinsed in water, treated for 10 minutes at 85° C in an aqueous solution containing 0.2% of sodium hydroxide and 0.2% of a non-ionic detergent (L.R. 50:1), rinsed again in water and finally dried.

The resulting rubine print is of solid shade and excellent fastness properties, and there is also excellent reserve of the white unprinted portions.

In place of the "Terylene"/cotton textile material used in this Example there is used a 67:33 polyethylene terephthalate/viscose rayon textile material when a similar result is obtained.

EXAMPLE 3

In place of the "Terylene"/cotton textile material used in Example 1 there is used a 67:33 polyethylene terephthalate/polynosic viscose ("Vincel"— a Registered Trade Mark) textile material when a similar result is obtained.

EXAMPLE 4

In place of the disperse dyestuff used in Example 1 there are used 1.5 parts of 4-(N:N-diethylamino)-3':4'-di(methoxycarbonyl) azobenzene, and in place of the two reactive dyestuffs used in Example 1 there are used 2.5 parts of the trisodium salt of 2-ureido-4-(4'-chloro-6'-amino-1':3':5':-triazin-2'-ylamino)-1-(3'':6'':8''-trisulphonaphth-2''-ylazo) benzene, when a golden yellow print is obtained which has excellent reserve of the white unprinted areas.

EXAMPLE 5

In place of the disperse dyestuff used in Example 4 there are used 2 parts of 2-acetylamino-4-[N-(β-cyanoethyl)-N-(β-(β'-methoxyethoxycarbonyl)ethyl) amino]-2'-5'-di(methoxycarbonyl)azobenzene when a similar golden yellow print is obtained.

EXAMPLE 6

In place of the disperse dyestuff used in Example 1 there are used 2 parts of 1:4-di(β-ethoxycarbonylethylamino)anthraquinone, and in place of the two reactive dyestuffs used in Example 1 there are used 3 parts of the hexasodium salt of 1-amino-2:7-di(2'-sulpho-4'[4''-chloro-6''-m-sulpho anilino-1'':3'':5''-triazin-2''-ylamino] phenylazo)-8-naphthol-3:6-disulphonic acid when a dark olive green print is obtained having excellent reserve of the white unprinted areas.

EXAMPLE 7

In place of the disperse dyestuff used in Example 1 there are used 2 parts of 2-(4'-(N:N-di[β-methoxycarbonylethyl]amino)phenylazo)-3:5-dinitrothiophene, and in place of the two reactive dyestuffs used in Example 1 there are used 3 parts of the tetrasodium salt of 3:10-di [3'-sulpho-4'-(4''-chloro-6''-hydroxy-1'':3'':-5''-triazin-2''-ylamino)anilino]-6:13-dichloro triphendioxazine-4:11-disulphonic acid and in place of the urea and sodium bicarbonate used in Example 1 there are used an additional 11 parts of water, when a blue print is obtained which has excellent reserve of the white unprinted areas.

EXAMPLE 8

The print paste described in Example 1 is printed onto a woven 67:33 "Terylene"/cotton textile material, and the textile material dried. The textile material is placed between two pieces of porous paper and the resulting sandwich passed continuously through a transfer printing calender (comprising a rotatable heated metal cylinder against which the sandwich is firmly held in contact by a support blanket), the temperature of the cylinder being 210° C and the time of contact of the sandwich with the surface of the cylinder being 30 seconds.

The textile material is then rinsed in water, treated for 10 minutes in an aqueous solution at 85° C containing 0.2% of sodium carbonate and 0.2% of a non-ionic detergent at a liquor to goods ratio of 50:1, rinsed again in water, and finally dried.

The textile material is thereby printed in a rubine shade having excellent reserve on the white unprinted portions, and the print has excellent fastness to wet treatments.

In place of the 0.2% of sodium carbonate used in the above washing liquor there is used 0.2% of sodium hydroxide or 0.2% of lithium hydroxide when a similar result is obtained.

In place of the 1 part of sodium bicarbonate used in the print paste there are used 3 parts of sodium trichloroacetate when a similar result is obtained.

EXAMPLE 9

In place of the "Terylene"/cotton union used in Example 1 there is used a woven 50:50 "Terylene"/cotton textile material when a similar result is obtained.

EXAMPLE 10

The process described in Example 2 is repeated except that after the baking treatment (1 minute at 200° C) the printed textile material is padded with a 10% aqueous solution of sodium silicate and the material then batched (i.e., stored in a roll) in the wet state for 4 hours at 20° C to effect fixation of the reactive dyestuff. The textile material is then rinsed in water and then given an alkaline rinse as described in Example 2. A similar rubine print is obtained.

EXAMPLE 11

The process of Example 1 is repeated except that the treatment in the aqueous solution containing 0.2% of sodium carbonate and 0.2% of a non-ionic detergent is replaced by a treatment for 10 minutes in a 0.2% aqueous solution of sodium hydroxide at 80° C. A similar result is obtained.

EXAMPLE 12

A dispersion of 1 part of 2-methyl-4-[N:N-di(β-methoxycarbonylethyl) amino]-2'-cyano-4'-nitroazobenzene in 7 parts of water containing 1 part of the disodium salt of bis(2-sulphonaphth-1-yl)methane is added to a mixture of:

| | |
|---|---|
| Sodium bicarbonate | 1 part |
| urea | |
| 2% Aqueous solution of the sodium salt of partially hydrolyzed polyacrylonitrile | |
| Sodium salt of an isopropylnaphthalene sulphonic acid | 0.05 part |
| Tetrasodium salt of 1-(4'-p-carboxyanilino-6'-chloro-1':3':5'-triazin-2'-ylamino)-7-(1''-sulphonaphth-2''-ylazo)-8-naphthol-3:6-disulphonic acid. | 1.5 parts |
| Trisodium salt of the copper complex of 2-(4'-amino-6'-chloro-1:3':5-triazin-2'-ylamino)-6-(2''-hydroxy-5''-methyl-4''-[2'''5'''-disulphophenylazo)phenylazo]-5-naphthol-7-sulphonic acid. | 0.1 part |
| Water to | 91 parts |

The resulting liquor is continuously padded onto a woven 50:50 "Terylene"/cotton textile material, the textile material is dried and is then baked for 60 seconds at 220° C.

The textile material is then rinsed in water, treated for 5 minutes at 80° C in an aqueous solution of 0.2% of sodium carbonate and 0.2% of a non-ionic detergent at a liquor to goods ratio of 50:1, rinsed again in water, and is finally dried.

The textile material is uniformly colored a rubine shade having excellent fastness to wet treatments.

In place of the 1 part of sodium bicarbonate used in the above padding liquor there are used 3 parts of sodium trichloroacetate when a similar result is obtained.

EXAMPLE 13

A dispersion of 1 part of 2-methyl-4-[N:N-di(β-methoxycarbonylethyl) amino]-2'-cyano-4'-nitroazobenzene in 7 parts of water containing 1 part of the disodium salt of bis(2-sulphonaphth-1-yl) methane is added to a mixture of

| | |
|---|---|
| 2% Aqueous solution of the sodium salt of partially hydrolyzed polyacrylonitrile. | 1 part |
| Tetrasodium salt of 1-(4'-p-carboxyanilino-6'-chloro-1':3':5'-triazin-2'-ylamino)-7-(1''-sulphonaphth-2''-ylazo)-8-naphthol-3:6-disulphonic acid. | 1.5 parts |
| Trisodium salt of the copper complex of 2-(4'-amino-6'-chloro-1':3':5'-triazin-2'-yl-N-methylamino)-6-[2''-hydroxy-5''-methyl-4''-(2''':5'''-disulphophenylazo)-5-naphthol-7-sulphonic acid | 0.1 part |
| Water | 91 parts |

The resulting liquor is continuously padded onto a woven 50:50 "Terylene"/cotton textile material, the material dried and then baked for 60 seconds at 220° C. The material is then continuously padded with an aqueous solution of 1% sodium hydroxide and 20% of sodium chloride at 20° C, and the material is then passed through a steamer at 102° C, the time of contact being 40 seconds. The material is rinsed for 30 seconds in cold water, then for 30 seconds in water at 50° C, washed for 30 seconds at 80° C in a 0.2% aqueous solution of sodium hydroxide (all these operations being carried out at a liquor to goods ratio of 100:1), rinsed again in water, and is finally dried.

The textile material is thereby uniformly colored in a rubine shade possessing excellent fastness to wet treatments.

EXAMPLE 14

| | |
|---|---|
| A liquor is prepared comprising | |
| 20% Aqueous dispersion of 2-methyl-4-[N:N di(β-methoxycarbonylethyl)amino]-2'-cyano-4'-nitroazobenzene. | 25 parts |
| Trisodium salt of the copper complex of 2-(dichlorotriazinylamino)-6-(2'-hydroxy-5'-sulphophenylazo)-5-naphthol-1:7-disulphonic acid. | 2 parts |
| 2% Aqueous solution of the sodium salt of partially hydrolyzed polyacrylonitrile | 1 part |
| Water to | 100 parts | and the liquor is continuously padded onto a woven 50:50 "Terylene"/viscose rayon textile material. The material is dried and is then baked for 1 minute at 220° C. The material is padded through an aqueous solution of 1% of sodium hydroxide and 20% of sodium chloride at 20° C, and is then batched for 3 hours at 20° C. The material is then rinsed and washed as described in Example 13. A rubine coloration having excellent wet fastness properties is obtained.

Similar results are obtained when the textile material used in the above Example is replaced by a 67:33 polyethyleneterephthalate/polynosic viscose textile material or by a 50:50 polyethyleneterephthalate/linen textile material.

EXAMPLE 15

In place of the 0.2% aqueous solution of sodium hydroxide used for the washing treatment in Example 13 there is used a 0.2% aqueous solution of each of the following compounds when similar results are obtained:
a. lithium hydroxide
b. potassium hydroxide
c. potassium carbonate
d. trimethylphenylammonium hydroxide In place of the disperse dyestuffs used in any of the above Examples there are used the disperse azo dyestuffs obtained by diazotizing the amines and coupling with the coupling components listed in Table I or the disperse dyestuffs listed in Table II whereby the polyethylene terephthalate fibres present in the unions are colored in the stated shades, and in place of the reactive dyestuffs used in any of the above Examples there are used the reactive dyestuffs listed in Table III whereby the cellulose fibres present in the unions are colored in the stated shades. However in selecting disperse dyestuffs from Tables I and II and reactive dyestuffs from Table III, the said dyestuffs and the quantities thereof are preferably chosen so that both types of fibres present in the union are colored to the same shade and to the same depth of shade. If necessary this is achieved by using mixtures of disperse dyestuffs and/or mixtures of reactive dyestuffs.

TABLE I

| Amine | Coupling Component | Shade |
|---|---|---|
| Aniline | N:N-di(β-methoxycarbonylethyl)aniline | Yellow |
| 2-chloroaniline | " | Yellow |
| 4-acetylaniline | " | Reddish-yellow |
| 4-nitroaniline | " | Reddish-orange |
| 2-bromo-4-nitroaniline | " | Scarlet |
| 2-nitroaniline | " | Orange |
| 2-methoxy-4-nitroaniline | " | Scarlet |
| 2:4-dinitroaniline | " | Red |
| 2-chloro-4:6-dinitroaniline | " | Rubine |
| 2-bromo-4:6-dinitroaniline | " | Rubine |
| 2-cyano-4:6-dinitroaniline | " | Violet |
| 3-nitroaniline | " | Reddish-yellow |
| 2-acetyl-4-nitroaniline | " | Scarlet |
| 2-methyl-4-nitroaniline | " | Reddish-orange |
| 4-nitroaniline | N:N-di(β-methoxycarbonylethyl)-m-toluidine | Scarlet |
| 2-bromo-4:6-dinitroaniline | 2-methoxy-5-acetylamino-N:N-di(β-methoxy carbonylethyl)aniline | Navy blue |
| 2-bromo-4:6-dinitroaniline | 3-acetylamino-N:N-di(β-methoxycarbonylethyl)aniline | Violet |
| 2-bromo-4:6-dinitroaniline | 3-chloroacetylamino-N:N-di(β-methoxy carbonylethyl)aniline | Violet |
| 2-chloro-4-nitro-6-cyanoaniline | 3-acetylamino-N:N-di(β-methoxycarbonylethyl)aniline | Violet |
| 2-cyano-4-nitroaniline | " | Violet |
| 2:4-dicyanoaniline | " | Red |
| 4-acetylaminoaniline | 3-cyano-N:N-di(β-methoxycarbonylethyl)aniline | Orange |
| 3-chloro-4-cyanoaniline | 2-ethoxy-5-acetylamino-N:N-di(β-methoxy carbonylethyl)aniline | Bluish-red |
| 6-ethylsulphonyl-2-amino benzthiazole | N:N-di(β-ethoxycarbonylethyl)aniline | Red |
| 2-cyano-4-nitroaniline | " | Bluish-red |
| 2-cyano-4-nitroaniline | N:N-di[β-(β'-hydroxyethoxycarbonyl)ethyl]aniline | Bluish-red |
| 2-cyano-4-nitroaniline | 3-chloro-N:N-di(β-methoxycarbonylethyl)aniline | Red |
| 2:4-dicyanoaniline | N:N-di(Γ-methoxycarbonylpropyl)-m-toluidine | Scarlet |
| 6-(β-hydroxyethylsulphonyl)-2-aminobenzthiazole | " | Bluish-red |
| 4-methylsulphonylaniline | 3-methylsulphonyl-N:N-di(β-methoxy carbonylethyl)aniline | Orange |
| 6-nitro-2-aminobenzthiazole | N:N-di(β-ethoxycarbonylethyl)aniline | Bluish-red |
| 4-nitro-2-aminobenzthiazole | " | Red |
| 4-chloro-6-nitro-2-amino benzthiazole | N:N-di(β-propoxycarbonylethyl)aniline | Bluish-red |
| methyl-4-aminobenzoate | 3-methylsulphonylamino-N:N-di(β-methoxy carbonylethyl)aniline | Orange |
| 2-cyano-4-nitroaniline | " | Red |
| 2:6-dicyano-4-nitroaniline | 3-acetylamino-N:N-di(β-methoxycarbonylethyl)aniline | Blue |
| 2-cyano-4-nitroaniline | N:N-di(Γ-methoxycarbonylpropyl)aniline | Red |
| 2-cyano-4-nitroaniline | N:N-di(Γ-methoxycarbonylpropyl)-m-toluidine | Violet |
| 2-cyano-4-nitro-6-chloroaniline | " | Violet |
| 3:4-dicyanoaniline | 2:5-dimethoxy-N:N-di(Γ-ethoxycarbonylpropyl)aniline | Orange |
| 2:5-dicyano-4:6-dichloroaniline | N:N-di(δ-methoxycarbonylbutyl)-m-toluidine | Red |
| 2:6-dichloro-4-nitroaniline | N:N-di(Γ-methoxycarbonylpropyl)-m-toluidine | Brown |
| 2-cyano-4:6-dinitroaniline | " | Violet |
| 2-chloro-4-nitroaniline | " | Bluish-red |
| 2-bromo-4:6-dinitroaniline | 2-ethoxy-5-acetylamino-N-[α:β-di(methoxy carbonyl)ethyl]aniline | Blue |
| 2-methoxycarbonyl-4-nitro aniline | N:N-di(β-methoxycarbonylethyl)aniline | Orange |
| 2-methoxycarbonyl-4-nitro aniline | 3-bromo-N:N-di(β-methoxycarbonylethyl)aniline | Orange |
| 2-methoxycarbonyl-4-nitro aniline | N:N-di(β-methoxycarbonylethyl)-m-toluidine | Red |
| 2-methoxycarbonyl-4-nitro aniline | 3-acetylamino-N:N-di(β-ethoxycarbonylethyl)aniline | Bluish-red |
| 2-methoxycarbonyl-4-nitro aniline | 3-formylamino-N:N-di(β-methoxycarbonylethyl)aniline | Bluish-red |
| 2-methoxycarbonyl-4-nitro aniline | 3-methoxy-N:N-di[β-(β'-hydroxyethoxycarbonyl)ethyl]aniline | Red |
| 2-chloro-4-nitroaniline | 3-acetylamino-N:N-di(ethoxycarbonylmethyl)aniline | Red |
| 2-methylsulphonyl-4-nitro aniline | N:N-di(β-methoxycarbonylethyl)aniline | Bluish-red |
| 2:4-dicyano-3:5-dimethyl-6-chloroaniline | N:N-di(β-methoxycarbonylethyl)-m-toluidine | Red |
| 2:6-dichloro-4-nitroaniline | 3:5-diacetylamino-N:N-di(β-methoxycarbonyl ethyl)aniline | Rubine |
| 2-amino-4-phenylthiadiazole | " | Red |
| 6-methoxy-2-aminobenz-thiazole | " | Red |
| 4-nitroaniline | " | Red |
| 2-cyano-4-nitro-6-bromo aniline | 3:5-diacetylamino-N:N-di(β-methoxycarbonyl ethyl)aniline | Blue |
| 2-amino-5-methylthiadiazole | " | Blue |
| 5-nitro-2-aminothiazole | " | Blue |

TABLE I-continued

| Amine | Coupling Component | Shade |
|---|---|---|
| dimethyl-2-aminoterephthalate | 1-ethyl-3-cyano-4-methyl-6-hydroxypyrid-2-one | Yellow |
| 2-amino-3-methoxycarbonyl-5-nitrothiophene | N:N-di(β-methoxycarbonylethyl)-m-toluidine | Blue |
| dimethyl-2-aminoterephthalate | 3-acetylamino-N-(β-cyanoethyl)-N-[β-(β'-methoxyethoxycarbonyl)ethyl]aniline | Golden-yellow |
| 3:4-di(methoxycarbonyl)aniline | N:N-diethylaniline | Golden-yellow |
| 3:5-dinitro-2-aminothiophene | N:N-di(β-methoxycarbonylethyl)-m-toluidine | Greenish-blue |
| 2-amino-3-ethoxycarbonyl-5-nitrothiophene | 2:5-dimethoxy-N-(β-methoxycarbonylethyl)aniline | Blue |
| 3:5-dinitro-2-aminothiophene | 3-acetylamino-N:N-di[β-(β'-methoxyethoxycarbonyl)ethyl]aniline | Blue |
| methyl-4-aminobenzoate | N-ethyl-N-(β-methoxycarbonylethyl)aniline | Yellow |
| methyl-4-aminobenzoate | 3-acetylamino-N-(β-cyanoethyl)-N-(β-ethoxycarbonylethyl)aniline | Yellow |

TABLE II

| Dyestuff | Shade |
|---|---|
| 1:4-di(β-ethoxycarbonylethylamino)anthraquinone | Blue |
| 1-amino-4-[4'-(α:β-di(β'-hydroxyethoxycarbonyl)ethyl)-anilino]anthraquinone | Blue |
| 1:4-di(β-methoxycarbonylethylamino)anthraquinone | Blue |
| 1:4-di(o-methoxycarbonylanilino)anthraquinone | Blue |

TABLE III

| Reactive Dyestuffs | Shade |
|---|---|
| Tetrasodium salt of 1-p-sulphophenyl-3-carboxy-4-[2'-sulpho-5'-(4''-chloro-6''-m-sulphoanilino-1''':3''':5'''-triazin-2'''-ylamino)phenylazo]-5-pyrazolone | Yellow |
| Trisodium salt of 1-ethyl-3-carbonamido-4-methyl-5-{2':4'-disulpho-5'-[2''-chloro-4''(4-sulpho-3-<2'-chloro-4'-amino-1':3':5'-triazin-2'-ylamino>anilino)-1''':5''-triazin-2''-ylamino]phenylazo}-6-hydroxypyrid-2-one | Greenish-yellow |
| Trisodium salt of 2-ureido-4-(4'-chloro-6'-amino-1':3':5'-triazin-2'-ylamino)-3'':6'':8''-trisulphonaphth-2''-ylazobenzene | Yellow |
| Disodium salt of 1-ethyl-3-carbonamido-4-methyl-5-[2':4'-disulpho-5'-(4'':6''-dichloro-1''':3''':5'''-triazin-2'''-ylamino)phenylazo]-6-hydroxypyrid-2-one | Greenish-yellow |
| Trisodium salt of 1-p-sulphophenyl-3-carboxy-4-[2'-sulpho-4'-(4'':6''-dichloro-1''':3''':5''-triazin-2''-ylamino)phenylazo]-5-pyrazolone | Yellow |
| Disodium salt of 1-(2':5'-dichloro-4'-sulphophenyl)-3-methyl-4-[2''-sulpho-5''-(4'''-chloro-6'''-ethoxy-1'''':3'''':5''''-triazin-2-ylamino)phenylazo]-5-pyrazolone | Yellow |
| Trisodium salt of 1-p-sulphophenyl-3-carboxy-4-(p-β-sulphatoethylsulphonylphenylazo)-5-pyrazolone | Yellow |
| Trisodium salt of 1-hydroxy-3-sulpho-6-(4'-chloro-6'-amino-1':3':5'-triazin-2-yl-N-methylamino)-2-(1'':5''-disulphonaphth-2''-ylazo)naphthalene | Orange |
| Disodium salt of 1-hydroxy-3-sulpho-6-(4'-isopropoxy-6'-chloro-1':3':5'-triazin-2-yl-N-methylamino)-2-(o-sulphophenylazo)naphthalene | Orange |
| Pentasodium salt of 1-[4''-chloro-6'-(2''-carboxy-4''-sulphoanilino)-1':3':5'-triazin-2'-ylamino]-7-(o-sulphophenylazo)-8-naphthol-3:6-disulphonic acid | Red |
| Disodium salt of 1-(4':6'-dichloro-1':3':5'-triazin-2'-ylamino)-7-phenylazo-8-naphthol-3:6-disulphonic acid | Red |
| Trisodium salt of 1-(4':6'-dichloro-1':3':5'-triazin-2'-ylamino)-7-(1''-sulphonaphth-2''-ylazo)-8-naphthol-3:6-disulphonic acid | Red |
| Disodium salt of 2-(2'-methoxy-5'-β-sulphatoethylsulphonylphenylazo)-1-naphthol-5-sulphonic acid | Red |
| Trisodium salt of 1-(2'-methylsulphonyl-5'-chloro-6'-methylpyrimid-4'-ylamino)-7-(o-sulphophenylazo)-8-naphthol-4:6-disulphonic acid | Red |
| Trisodium salt of 1-(trichloropyrimidylamino)-7-(o-sulphophenylazo)-8-naphthol-3:6-disulphonic acid | Red |
| Sodium salt of copper phthalocyanine(3-sulphonic acid)$_{2.7}$[3-N-(4'-methoxy-6'-chloro-1':3':5'-triazin-2'-ylaminoethyl)sulphonamide]$_{1.3}$ | Turquoise |
| Sodium salt of copper phthalocyanine(3-sulphonic acid)$_{1.4}$[3-N-(4'-methoxy-6'-sulpho-1':3':5'-triazin-2'-yl-N-β-hydroxyethylaminoethyl)sulphonamide]$_{2.6}$ | Turquoise |
| Sodium salt of copper phthalocyanine(3-sulphonic acid)$_{1.3}$(3-sulphonamide)$_{1.2}$(3-N-β-chloroethylsulphonamide)$_{1.5}$ | Turquoise |
| Pentasodium salt of 1-amino-2-(2':5'-disulphophenylazo)-7-[2''-sulpho-5''-(dichloro triazinylamino)phenylazo]-8-naphthol-3:6-disulphonic acid | Blue |
| Disodium salt of 1-amino-4-[2':4':6'-trimethyl-3'-sulpho-5'-(4''-chloro-6''-methoxy-1''':3''':5'''-triazin-2'''-ylamino)anilino]anthraquinone-2-sulphonic acid | Blue |
| Disodium salt of 1-amino-4-[3'-(dichlorotriazinylamino)-4'-sulphoanilino]anthraquinone-2-sulphonic acid | Blue |
| Tetrasodium salt of the copper complex of 1-(4'-amino-6'-chloro-1':3':5'-triazin-2'-ylamino)-7-(1'''-hydroxy-4''':8'''-disulphonaphth-2'''-ylazo)-8-naphthol-3:6-disulphonic acid | Blue |
| Trisodium salt of 2-(4'-amino-6'-chloro-1':3':5'-triazin-2'-yl-N-methylamino)-6-[2''-hydroxy-5''-methyl-4''-(2''''':5'''''-disulphophenylazo)phenylazo]-5-naphthol-7-sulphonic acid | Navy-blue |
| Trisodium salt of 1-amino-4-[3'-sulpho-4'-(4''-chloro-6''-sulphoanilino-1''':3''':5'''-triazin-2'''-ylamino)anilino]anthraquinone-2-sulphonic acid | Blue |
| Tetrasodium salt of the copper complex of 2-methoxy-5-(difluorochloropyrimidylamino)-3'-hydroxy-4'-(1'''-hydroxy-3''':6''':8'''-trisulphonaphth-2'''-ylazo)azobenzene-3-sulphonic acid | Navy-blue |
| Trisodium salt of the copper complex of 2-(dichlorotriazinyl-N-methylamino)-6-[2'-hydroxy-5'-methyl-4'-(2''':5'''-disulphophenylazo)phenylazo]-5-naphthol-7-sulphonic acid | Navy-blue |
| Sodium salt of the 1:2-chromium complex of 2-(4'-methoxy-6'-chloro-1':3':5'-triazin-2'-ylamino)-6-(o-carboxyphenylazo)-5-naphthol-7-sulphonic acid | Brown |
| Trisodium salt of 1-(4'-isopropoxy-6'-chloro-1':3':5'-triazin-2'-ylamino)-4-[2'':5''-dimethyl-4''-(2''''':5'''''-disulphophenylazo)phenylazo]naphthalene-8-sulphonic acid | Orange |
| Tetrasodium salt of 1-(4'-amino-6'-chloro-1':3':5'-triazin-2'-ylamino)-4-[2'':5''- | Orange- |

TABLE III-continued

| Reactive Dyestuffs | Shade |
|---|---|
| dimethyl-4''-(2''':6''':8'''-trisulphonaphth-1'''-ylazo)phenylazo]naphthalene-6-sulphonic acid | brown |
| Sodium salt of the mixed 1:2-chromium and cobalt complexes of 1-(4'-amino-6'-chloro-1':3':5'-triazin-2'-ylamino)-7-(2''-hydroxy-5''-nitrophenylazo)-8-naphthol-3:6-disulphonic acid | Black |
| Sodium salt of 3-(N-ethyl-N-m-sulphobenzylamino)-5-(3'-sulpho-4'-methoxyphenyl)-7-[2''-sulpho-4''-(methoxychlorotriazinylamino)anilino]phenazine | Blue |
| Sodium salt of 2:7-di(m-β-sulphatoethylsulphonylphenylazo)-1-amino-8-naphthol-3:6-disulphonic acid | Black |
| Sodium salt of 1-(dichloropyrimidylamino)-7-(o-sulphophenylazo)-8-naphthol-3:6-disulphonic acid | Red |
| Sodium salt of 1-(trichloropyrimidylamino)-7-(o-sulphophenylazo)-8-naphthol-3:6-disulphonic acid | Red |
| Hexasodium salt of 2:7-di[2'-sulpho-4'-(4''-m-sulphoanilino-6''-chloro-1'':3'':5''-triazin-2''-ylamino]-1-amino-8-naphthol-3:6-disulphonic acid | Green |

What we claim is:

1. An improved process for the continuous coloration of aromatic polyester/cellulose unions which comprises continuously applying to the said unions a reactive dyestuff and a disperse dyestuff which is free from sulphonic acid and carboxylic acid groups and which contains at least two carboxylic acid ester groups, fixing the dyestuffs on the union, and thereafter subjecting the colored union to a treatment in an aqueous alkaline bath at a pH above 8.0 and at a temperature between 50° and 85° C.

2. Process as claimed in claim 1 which comprises continuously padding or printing the union with a padding liquor or print paste containing the disperse dyestuff, the ractive dyestuff and an alkaline agent, drying the union, subjecting the union to a heat treatment, and then treating the union in the aqueous alkaline bath.

3. Process as claimed in claim 1 which comprises continuously padding or printing the union with a padding liquor or print paste containing the disperse dyestuff, drying the union, subjecting it to a heat treatment, thereafter padding or printing the union with a padding liquor or print paste containing the reactive dyestuff, fixing the reactive dyestuff, and then treating the union in the aqueous alkaline bath.

4. Process as claimed in claim 1 which comprises continuously padding or printing the union with a padding liquor or print paste containing the reactive dyestuff, fixing the reactive dyestuff, padding or printing the union with a print paste or padding liquor containing the disperse dyestuff, fixing the disperse dyestuff, and then treating the union in the aqueous alkaline bath.

5. Process as claimed in claim 1 wherein the disperse dyestuff is a disperse dyestuff of the monoazo series containing at least two carboxylic acid ester groups.

6. Process as claimed in claim 1 wherein the disperse dyestuff is a disperse dyestuff of the monazo series containing two or three lower alkoxycarbonyl groups.

7. Process as claimed in claim 1 wherein the reactive dyestuff contains as the fibre-reactive group a heterocyclic ring having two or three nitrogen atoms in the ring and at least one labile substituent attached to a carbon atom of the heterocyclic ring.

8. Process as claimed in claim 7 wherein the reactive dyestuff contains a triazine or pyrimidine ring containing as the labile substituent at least one chlorine, bromine or fluorine atom.

* * * * *